United States Patent
Gläser

(10) Patent No.: US 7,756,133 B2
(45) Date of Patent: Jul. 13, 2010

(54) METHOD FOR PROCESSING A SEQUENCE OF DATA PACKETS IN A RECEIVER APPARATUS, AS WELL AS A RECEIVER APPARATUS

(75) Inventor: Frank Gläser, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 926 days.

(21) Appl. No.: 11/093,511

(22) Filed: Mar. 30, 2005

(65) Prior Publication Data

US 2005/0232276 A1 Oct. 20, 2005

(30) Foreign Application Priority Data

Apr. 15, 2004 (DE) .................. 10 2004 018 200

(51) Int. Cl.
*H04L 12/28* (2006.01)
*H04L 12/56* (2006.01)
*H04J 3/24* (2006.01)
*H04J 3/06* (2006.01)

(52) U.S. Cl. .................. 370/394; 370/474; 370/509; 370/516; 370/412; 370/415; 370/417; 370/395.72

(58) Field of Classification Search .................. 370/394, 370/516, 412, 415, 417, 395.72
See application file for complete search history.

(56) References Cited

U.S. PATENT DOCUMENTS

| | | | | |
|---|---|---|---|---|
| 5,491,728 | A * | 2/1996 | Verhille et al. | 375/362 |
| 6,006,270 | A * | 12/1999 | Kobunaya | 709/233 |
| 6,182,146 | B1 * | 1/2001 | Graham-Cumming, Jr. | 709/238 |
| 6,252,851 | B1 * | 6/2001 | Siu et al. | 370/236 |
| 6,259,677 | B1 * | 7/2001 | Jain | 370/252 |
| 6,360,271 | B1 * | 3/2002 | Schuster et al. | 709/231 |
| 6,405,275 | B1 * | 6/2002 | Morrow et al. | 710/305 |
| 6,452,950 | B1 * | 9/2002 | Ohlsson et al. | 370/516 |
| 6,687,752 | B1 * | 2/2004 | Falco et al. | 709/230 |

(Continued)

FOREIGN PATENT DOCUMENTS

EP 1 278 339 A1 1/2003

*Primary Examiner*—Daniel J Ryman
*Assistant Examiner*—Andrew Oh
(74) *Attorney, Agent, or Firm*—Robert D. Shedd; Harvey D. Fried; Joel M. Fogelson

(57) ABSTRACT

The invention relates to a method for processing a sequence of data packets in a receiver apparatus, in particular a sequence of audio and/or video data packets, as well as to a receiver apparatus. The method comprises the following steps: reception of a data packet in the sequence of data packets in the receiver apparatus via a data link; determination of identification information for the data packet, which information indicates the position of the data packet in the sequence of data packets; sorting of the data packet into a sequence of data packets to be processed in a queue corresponding to the identification information, with the data packets to be processed comprising the sequence of data packets; determination of a time value from a time marking of a first data packet to be processed in the queue and of a further time value from a time marking of a last data packet to be processed in the queue; determination of the time difference between the time value and the further time value; and transfer of at least the first data packet to be processed in the queue for processing to a processing device if the time difference is greater than or equal to a predetermined time threshold value.

10 Claims, 2 Drawing Sheets

U.S. PATENT DOCUMENTS

| | | | |
|---|---|---|---|
| 6,697,372 B1 * | 2/2004 | McAlear | 370/402 |
| 6,735,213 B2 * | 5/2004 | Speciner | 370/412 |
| 6,810,045 B1 * | 10/2004 | Brune et al. | 370/498 |
| 6,816,492 B1 * | 11/2004 | Turner et al. | 370/394 |
| 6,950,400 B1 * | 9/2005 | Tran et al. | 370/236 |
| 7,289,523 B2 * | 10/2007 | Glaise et al. | 370/413 |
| 7,346,005 B1 * | 3/2008 | Dowdal | 370/252 |
| 7,397,825 B2 * | 7/2008 | Woodward et al. | 370/516 |
| 7,474,624 B2 * | 1/2009 | Grossman | 370/252 |
| 7,508,845 B2 * | 3/2009 | Baker | 370/516 |
| 2003/0152094 A1 * | 8/2003 | Colavito et al. | 370/412 |
| 2004/0017775 A1 * | 1/2004 | Omae et al. | 370/235 |
| 2004/0064517 A1 * | 4/2004 | Uenoyama et al. | 709/207 |
| 2004/0153716 A1 * | 8/2004 | Baker | 714/4 |
| 2005/0002402 A1 * | 1/2005 | Fairman | 370/395.5 |
| 2005/0201399 A1 * | 9/2005 | Woodward et al. | 370/412 |

\* cited by examiner

METHOD FOR PROCESSING A SEQUENCE OF DATA PACKETS IN A RECEIVER APPARATUS, AS WELL AS A RECEIVER APPARATUS

This application claims the benefit, under 35 U.S.C. §119 of

German Patent Application 102004018200.0, filed Apr. 15, 2004.

FIELD OF THE INVENTION

The invention relates to a method for processing a sequence of data packets in a receiver apparatus, in particular a sequence of audio and/or video data packets, and to a receiver apparatus.

BACKGROUND OF THE INVENTION

When audio and video data packets are being transmitted between a transmitter apparatus and a receiver apparatus, the data packets are interchanged on the basis of a transmission protocol. The transmission protocols which may be used include real-time protocols such as RTP (RTP—"Real Time Transport Protocol"). RTP is a protocol which is based on the so-called UDP/IP protocol (User Datagram Protocol/Internet Protocol). RTP was developed in order to provide synchronization between the transmitted data packets for real-time transmission in unipoint and multipoint links by means of the UDP/IP protocol, which is not secure or reliable. In conjunction with audio/video data packets in IP networks, RTP forms the basis for organized data transmission.

Fundamentally, an RTP data packet comprises the following parts: an RTP header and RTP payload data, with the RTP header comprising header data (see R. Schoblick: Das Real Time Transport Protocol, Funkschau [The Real-Time Transport Protocol, Radio Show], 26 (2000) 47). It is possible to distinguish between fixed elements and an optional extension (header extension) in the RTP header. The elements which are defined in the RTP header of each data packet include a sequence number, which indicates the position of the associated data packet in a sequence of data packets to be transmitted.

The RTP header also has a so-called timestamp, which is in the form of a time marking which can be used for this purpose in the receiver apparatus to counteract jitter phenomena caused by propagation time differences in order in this way to achieve the synchronization and time coordination of the transmitted RTP data packets in the receiver apparatus. The time marking (timestamp) normally indicates the time of transfer of the associated data packet from the transmitter apparatus to the data link which is used for transmission of the data packet between the transmission apparatus and the receiver apparatus. Alternatively, the time marking may, however, also be calculated in the future, with the intention of indicating the time at which the data in the packet in the receiver is intended to be passed on to the application.

The sequence number from the RTP header is used by the receiver apparatus in order to change the data packets (whose sequence with respect to one another will have been changed during the transmission via the data link) back to the correct sequence. This is done in the receiver apparatus in a queue memory area in which the data packets received in the receiver apparatus are organized in a sorting queue on the basis of their respective sequence number. There must always be a certain number of received data packets in the sorting queue for this sorting process in order to compensate for as many interchanges to data packets as possible occurring as a result of the transmission via the data link. If a data packet is passed on in the receiver apparatus too quickly from the sorting queue for processing, then data packets which arrive later and have a lower sequence number can no longer be put in the correct position. On the other hand, it is necessary to avoid excessively long waiting periods before the received data packets are released for further processing since it is also possible for packets to be lost during transmission via the data link, which would then result in infinite waiting times for the received data packets in the sorting queue. Furthermore, with regard to operation of the sorting queue, it is necessary to be aware that the data packets are generally processed immediately (in real time) in the receiver apparatus, and that the transmission rate of the transmitted data packets can change at any time. Known methods in which a fixed number of received data packets are temporarily stored in the sorting queue do not adequately satisfy these different requirements.

BRIEF DESCRIPTION OF PREFERRED EMBODIMENTS

The invention is based on the object of specifying a method for processing a sequence of data packets in a receiver apparatus, in particular a sequence of audio and/or video data packets, as well as a receiver apparatus, in which interchanges to data packets after transmission via a data link are corrected as completely as possible in the receiver apparatus, even when the transmission rates vary, thus allowing real-time processing of the transmitted data packets.

The object is achieved by a method having the features specified in claim 1, and by a receiver apparatus having the features specified in claim 8.

Advantageous developments are specified in the dependent claims.

The invention includes the idea of providing the following steps for a method for processing a sequence of data packets in a receiver apparatus, in particular a sequence of audio and/or video data packets: reception of a data packet in the sequence of data packets in the receiver apparatus via a data link; determination of identification information for the data packet, which information indicates the position of the data packet in the sequence of data packets; sorting of the data packet into a sequence of data packets to be processed in a queue corresponding to the identification information, with the data packets to be processed being comprising the sequence of data packets; determination of a time value from a time marking of a first data packet to be processed in the queue and of a further time value from a time marking of a last data packet to be processed in the queue; determination of the time difference between the time value and the further time value; and transfer of at least the first data packet to be processed in the queue for processing to a processing device if the time difference is greater than or equal to a predetermined time threshold value.

According to a further aspect of the invention, a receiver apparatus is provided which has the following features: a processing device for processing a sequence of data packets; a queue memory area for storage of a queue of data packets to be processed, with the data packets to be processed comprising the sequence of data packets; test means for determination of a time value from a time marking of a first data packet to be processed in the queue and of a further time value from a time marking of a last data packet to be processed in the queue, and for determination of the time difference between the time value and the further time value; and transfer means for transferring at least the first data packet to be processed in the queue for processing to the processing device when the time difference is greater than or equal to a predetermined time threshold value.

One advantage which is achieved by the invention in comparison to the prior art is that a fixed time delay for the data packets stored in the queue is defined for the queue in the receiver apparatus. This is advantageous in particular in conjunction with a method in which the transmitted data packets are then decoded immediately, which is a major application for the use of RTP.

As a result of the definition of a predetermined time delay, the number of data packets temporarily stored in the queue before further processing varies with the transmission rate. The number of temporarily stored data packets in the queue increases as the transmission rate rises. Since the number of interposed data packets and lost data packets on the data link that is used for transmission also rises as the transmission rate increases, the greater number of temporarily stored data packets in the queue allows the received data packets to be sorted more efficiently in the receiver apparatus. In this way, the number of data packets temporarily stored in the queue is automatically adapted in proportion to the probability of interposed data packets and lost data packets.

DETAILED DESCRIPTION OF PREFERRED EMBODIMENTS

Figure 1:
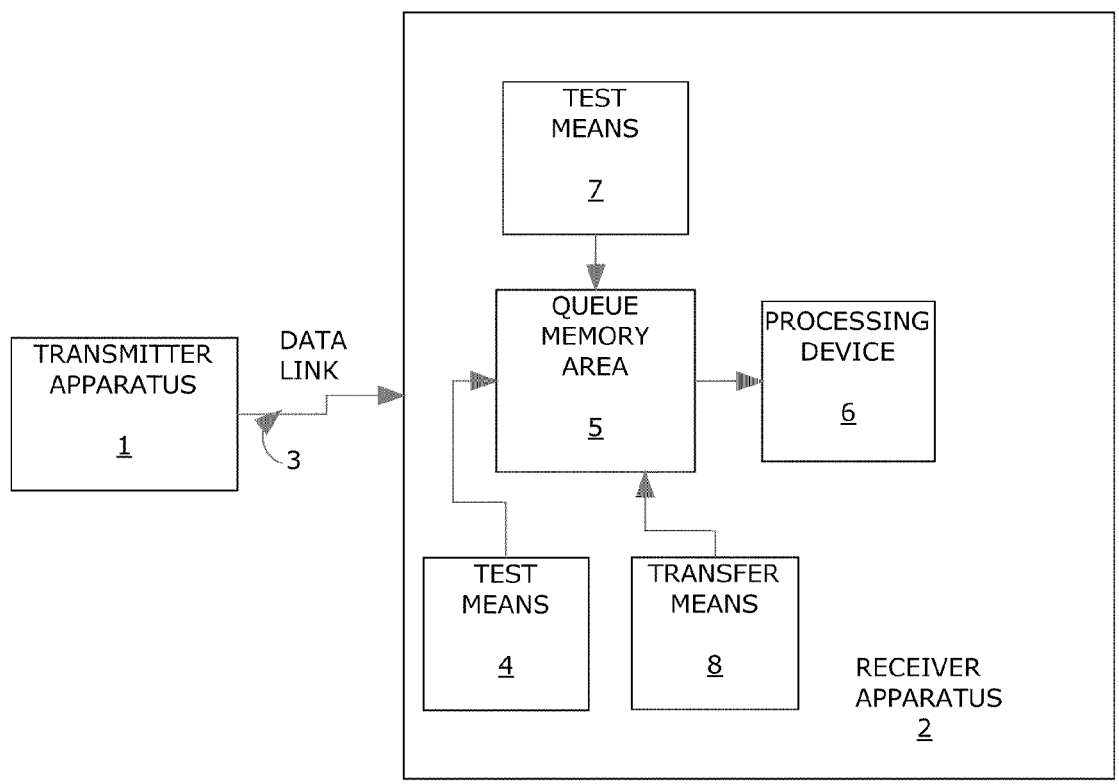
FIG. 1 shows a schematic illustration of an arrangement having a transmitter apparatus and having a receiver apparatus, which are connected via data link for transmission of data packets.
Figure 2:
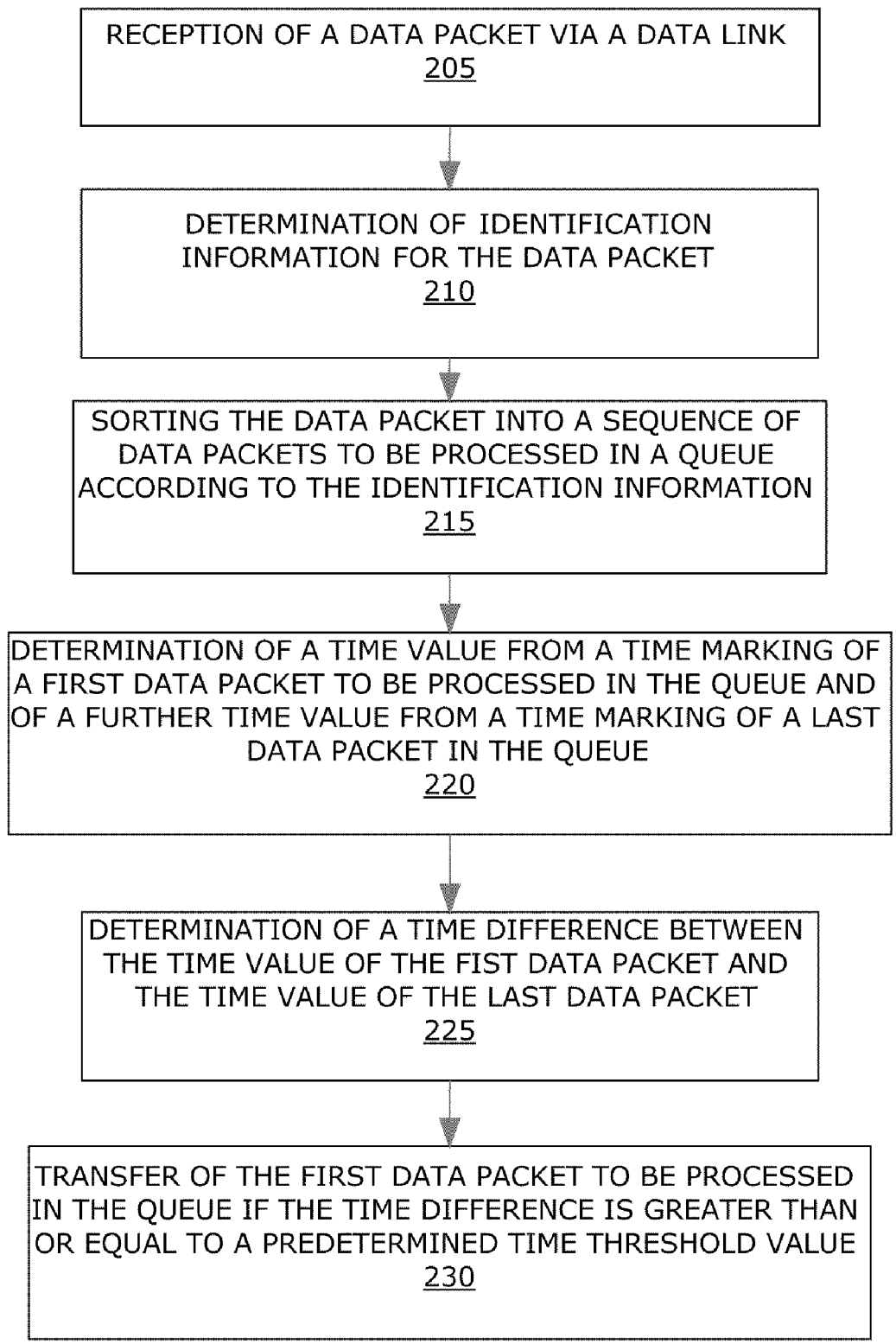
FIG. 2 shows a method of determining whether to transfer a data packet in accordance with an embodiment of the invention.

The single FIGURE shows a schematic illustration of an arrangement having a transmitter apparatus 1 and a receiver apparatus 2, which are connected via a data link 3. The transmitter apparatus 1 and the receiver apparatus 2 may be any desired electronic appliances between which electronic data, in particular video and/or audio data, can be interchanged, in which case the transmitter apparatus 1 and the receiver apparatus 2 can be integrated in a network, for example an IP network. In this case, the data link 3 is a network link, in particular an IP network link, that is for example a telephone connection, with the receiver apparatus 2 being equipped with a modem in order to receive the data (not illustrated).

Data packets are interchanged between the transmitter apparatus 1 and the receiver apparatus 2 via the data link 3 on the basis of RTP (RTP—"Real Time Transport Protocol") In this case, the data packets are produced in the transmitter apparatus 1 itself or in an apparatus (not illustrated) which is separate from it, and are then transmitted to the transmitter apparatus 1, which then transfers the data packets to the data link 3.

According to the RTP convention, the data packets have an RTP header and RTP payload data. Part of the respective RTP header of the data packets is a sequence number which provides identification information for each data packet, indicating the position of the associated data packet in a sequence of data packets which are transmitted between the transmitter apparatus 1 and the receiver apparatus 2 and are processed in the receiver apparatus 2. Furthermore, the RTP header has a time marking (timestamp) which includes transfer time information which indicates the time of transfer of an associated data packet from the transmitter apparatus 1 to the data link 3. The time information formed in this way for the respective data packets normally makes it possible to compensate for jitter phenomena during the transmission of the data packets via the data link 3 in the receiver apparatus 2, in order to achieve time synchronization.

According to the figure, the receiver apparatus 2 has test means 4 by means of which the sequence number of the data packets received in the receiver apparatus 2 is determined in order then to arrange the associated data packet, on the basis of the sequence number, in a sequence of already stored data packets in a queue memory area 5. The queue in the queue memory area 5 comprises received data packets which are temporarily stored before being processed further by means of a processing device 6.

Once the received data packet has been arranged in the right place, further test means 7 are used to check the time marking of a first data packet in the sequence of data packets in the queue, and the time marking of a last data packet in the sequence of data packets in the queue. The expressions first and last data packets relate to the position of the associated data packet in the sequence of data packets in the queue, and not to the time of reception of the associated data packet in the receiver apparatus 2. The data packets in the queue are sorted on the basis of their associated sequence number.

The time markings for the first and the last data packet in the sequence of data packets in the queue are evaluated in order to determine a respectively associated time value, which indicates the time at which the associated data packet was transferred from the transmitter apparatus 1 to the data link 3. The further test means 7 are then used to determine the time difference between the time value for the first data packet and the time value for the last data packet. If the time difference is greater than or equal to a predetermined time threshold value, the transfer means 8 are used to transfer at least the first data packet from the queue to the processing device 6 for further processing. The time marking for the data packet which is now the first in the queue, and which was previously the second data packet, is then evaluated. Once again, the time difference between the time value for the data packet which is now the first and the last data packet is determined. If the time difference still exceeds the time threshold value or is the same as the threshold value, the data packet which is now the first is likewise transferred to the processing device 6 for further processing. This procedure is continued until the determined time difference is shorter than the predetermined time threshold value. In this case, a further data packet is then received and is placed in the correct position. The predetermined time threshold value can be changed in order to adapt it as a function of the situation.

With a fixed time threshold value, the procedure described above allows automatic adaptation of the possible number of data packets in the queue for different transmission rates since, as the transmission rate increases, a greater number of data packets are potentially temporarily stored within the same time period in the queue.

What is claimed is:

1. Method for processing a sequence of a plurality of data packets in a receiver apparatus, the data packets including a sequence of audio and/or video data packets, with the method comprising the following steps:
   a) reception (205) of a data packet in the sequence of data packets in the receiver apparatus via a data link;
   b) determination (210) of identification information for the data packet, which information indicates the position of the data packet in the sequence of data packets;

c) sorting (215) of the data packet into the sequence of data packets to be processed in a queue corresponding to the identification information, with the data packets to be processed comprising the sequence of data packets, the data packets being arranged in the queue according to an order they have to be processed, a first data packet in said sequence of data packets having to be processed first and a last data packet in said sequence of data packets having to be processed last;

d) determination (220) of a time value from a time marking of the first data packet to be processed in the queue and of a further time value from the time marking of the last data packet to be processed in the queue, said time marking information being received with said data packets;

e) determination (225) of a time difference between the time value of the first data packet and the further time value of the last data packet; and f) transfer (230) of at least the first data packet to be processed in the queue for processing to a processing device if the time difference is greater than or equal to a predetermined time threshold value.

2. Method according to claim 1, wherein steps d), e) and f) are repeated for remaining data packets which remain after the transfer of at least the first data packet to be processed in the queue, until the time difference of step e is less than the predetermined threshold value.

3. Method according to claim 1, wherein the identification information is derived from a sequence number for the first data packet.

4. Method according to claim 1, wherein the time value is determined from transfer time information which, on the transfer of the first data packet to be processed from a transmitter apparatus to the receiver apparatus, indicates a time of transfer of the first data packet to be processed from the transmitter apparatus to the data link, and in that the further time value is determined from transfer time information which, for transfer of the last data packet to be processed from the transmitter apparatus to the receiver apparatus, indicates a time of transfer of the last data packet to be processed from the transmitter apparatus to the data link.

5. Method according to claim 1, wherein the identification information is determined from a header data set of the first data packet.

6. Method according to claim 1, wherein the time value for the first data packet to be processed and the further time value for the last data packet to be processed are determined from a respective header data set.

7. Method according to claim 1, wherein the sequence of data packets is received and processed in the receiver apparatus using a real-time protocol.

8. The method of claim 1 wherein said time marking information is inserted by a transmission apparatus which is used to transmit said sequence of data packets.

9. Receiver apparatus, for processing a sequence of data packets, said apparatus comprising:

a processing device for processing the sequence of data packets;

a queue memory area for storage of a queue of data packets to be processed from the sequence of data packets;

test means for determination of a time value from a time marking of a first data packet to be processed in the queue of data packets and of a further time value from a time marking of a last data packet to be processed in the queue of data packets, and for determination of a time difference between the time value of the first data packet and the further time value of the last data packet, said time marking information being received with said sequence of data packets; and transfer means for transferring at least the first data packet to be processed in the queue for processing at the processing device when the time difference is greater than or equal to a predetermined time threshold value.

10. The apparatus of claim 9 wherein said time marking information is inserted by a transmission apparatus which is used to transmit said sequence of data packets.

\* \* \* \* \*